Patented June 7, 1932

1,862,049

UNITED STATES PATENT OFFICE

HOWARD M. CHILES, OF CHAMPAIGN, ILLINOIS, ASSIGNOR TO PYRO-PACK PRODUCTS CO., OF CHICAGO, ILLINOIS

DI-IODO-HYDROXY MERCURY FLUORESCEIN

No Drawing.   Application filed April 9, 1925.   Serial No. 21,765.

My invention relates to a certain new and useful di-iodo-hydroxy-mercury-fluorscein especially adapted for use as a dye or coloring matter and as a germicide, the object of the invention being to provide an improved and efficient chemical compound for the purposes indicated.

The invention consists in the chemical compound hereinafter described and claimed.

The new compound produced I call di-iodo-hydroxy-mercury-fluorescein, the same being represented and indicated by the chemical formula $C_{20}H_{10}O_6I_2Hg$.

In preparing this compound fluorescein, $C_{20}H_8O_5$ is heated with exactly two gramme atoms of iodine, in the presence of an oxidizing agent, preferably copper sulphate or potassium chlorate. In practice 33.2 g. of fluorescein is dissolved in 100 cc. of 95% alcohol and 25.4 g. of iodine is added and the whole is heated under a condenser until the fluorescein is dissolved. 4.5 g. of potassium chlorate and 4.5 g. copper sulphate dissolved in 15 c. c. of watter is then added to the cooled alcoholic solution. This solution is then boiled under a reflux condenser for a period of about two hours and di-iodo-fluorescein, $C_{20}H_6O_5I_2$ is formed in the solution. The solution is then diluted with two liters of water which causes the di-iodo-fluorescein to precipitate in the form of a red precipitate which is removed from the solution by filtration. The di-iodo-fluorescein thus obtained is a red amorphous powder somewhat more red than the fluorescein and melting with decomposition above 300° C.

The di-iodo-fluorescein thus obtained is then dissolved in alkali, caustic soda or caustic potash, and then heated with mercuric acetate $C_4H_6O_4Hg$ and sufficient free acetic acid $C_2H_4O_2$ to liberate the free di-iodo-fluorescein; the sodium acetate formed acting as a buffer; In practice 58.4 g. of di-iodo-fluorescein is dissolved in 50 cc. of water containing 8 g. of sodium hydroxide and diluted to 200 cc. This is stirred vigorously and treated with 12.5 cc. of glacial acetic acid. A solution of 22.5 g. of yellow oxide of mercury dissolved in 25 cc. of glacial acetic acid and 50 c. c. of water diluted to 100 cc. after solution, is added and the whole diluted to 500 cc. This solution is boiled under a reflux condenser with mechanical stirring for about six hours and the di-iodo-hydroxy-mercury-fluorescein is precipitated in the form of a dark red powdered material which is filtered therefrom by suction, washed and dried at 100° C. when it is ready for use.

The compound thus obtained constitutes an excellent dye or coloring matter for rouges, lipstick and cosmetics and is rendered water soluble by any alkali. It also constitutes an efficient germicide for use in open wounds. It may be used free or as a salt, that is, dissolved in alkali.

While I have set forth the preferred method of producing the compound this is capable of some variation and modification without departing from the spirit of the invention. I, therefore, do not wish to be limited to the precise details set forth, but desire to avail myself of such variations and modifications as come within the scope of the appended claims.

Having described my invention, what I claim as new and desire to secure by Letters Patent is:

1. The herein described compound consisting of di-iodo-hydroxy-mercury fluorescein which corresponds to the chemical formula $C_{20}H_{10}O_6HgI_2$, substantially as described.

2. The herein described compound consisting of di-iodo-hydroxy-mercury fluorescein which corresponds to the chemical formula $C_{20}H_{10}O_6HgI_2$ rendered water soluble by an alkali, substantially as described.

3. The herein described product resulting from the reaction of a suspension of di-iodo-fluorescein with mercuric acetate in equal molecular proportions.

In testimony whereof I have signed my name to this specification.

HOWARD M. CHILES.